Patented Aug. 20, 1929.

1,725,080

UNITED STATES PATENT OFFICE.

ERWIN HOFFA AND RUDOLF BRUNE, OF HOCHST-ON-THE-MAIN, AND JENS MÜLLER, OF HANAU-ON-THE-MAIN, GERMANY, ASSIGNORS TO GENERAL ANILINE WORKS, INC., OF NEW YORK, N. Y., A CORPORATION OF DELAWARE.

PROCESS FOR MAKING 4-ALKYLOXYBENZENE-1-CARBOXYAMINO-2-THIOGLYCOLLIC ACIDS.

No Drawing. Application filed August 9, 1927, Serial No. 211,851, and in Germany April 16, 1927.

Our present invention relates to 4-alkyloxybenzene-1-carboxyamino-2-thioglycollic acids and to a process of making them.

In the co-pending U. S. patent application in the name of Hoffa, Müller and Müller, Ser. No. 211,850, filed August 9, 1927. is described 1-methyl-5-chlorobenzene-2-carboxyamino-3-thioglycollic acid and a process of making it by treating 1-methyl-5-chloro-2-cyanobenzene-3-thioglycollic acid in a suitable manner with acid saponifying agents.

We have found furthermore that the 4-alkyloxybenzene-1-carboxyamino-2-thioglycollic acids of the formula:

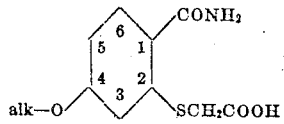

are obtained by subjecting the 4-alkyloxy-1-cyanobenzene-2-thioglycollic acids to the same reaction. Halogen-substitution products of the said acids give the same reaction.

The reaction most probably is effected in accordance with the following equation:

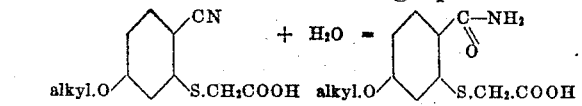

The following examples serve to illustrate our invention but they are not intended to limit it thereto, the parts being parts by weight.

1. 223 parts of 4-ethoxy-1-cyanobenzene-2-thioglycollic acid, obtainable, for instance, by starting from p-phenetidine and proceeding according to the processes described in British Patents No. 17417/1914 and No. 18292/1914, are mixed with 1100 parts of sulfuric acid of 90% strength and the mixture is heated for 10 minutes to 90° C. The mass is poured onto ice and after some time the precipitate of 4-ethoxybenzene-1-carboxyamino-2-thioglycollic acid which has formed is filtered by suction. The compound is purified by dissolving it in aqueous ammonia, boiling up the solution so obtained with animal charcoal, filtering and precipitating it with diluted sulfuric acid. After recrystallization from acetic acid it melts at 208° C to 210° C.

2. 10 parts of 4-ethoxy-1-cyanobenzene-2-thioglycollic acid are dissolved at room temperature in 30 parts by volume of sulfuric acid of 90% strength. After having allowed the solution to stand for 18 hours it is poured into 210 parts of water. The compound precipitates at first as an oily substance; it soon solidifies and after being subjected to the purification operation above mentioned in Example 1, it shows the same properties as the compound obtained according to this example.

3. 20 parts of 4-methoxy-1-cyanobenzene-2-thioglycollic acid, obtainable, for instance, by starting from p-anisidine and proceeding according to the processes described in British Patents No. 17417/1914 and No. 18292/1914, are mixed with 100 parts of sulfuric acid of 90% strength. The resulting solution is rapidly heated to 90° C. and kept at this temperature for 10 minutes while stirring. The whole is then brought onto ice and, after a while, the precipitate produced is filtered by suction. The purification of the compound is performed as indicated in example 1. The resulting product, 4-methoxybenzene-1-carboxyamino-2-thioglycollic acid, so obtained melts, after being recrystallized from acetic acid, at 208° C. to 210° C.

4. 47 parts of 5-brom-4-ethoxy-1-cyanobenzene-2-thioglycollic acid, produced, for instance, by the process described in D. R. P. 371 258 are introduced into 275 parts of sulfuric acid of 90% strength and the mixture is heated for a quarter of an hour to 95° C. The mass is poured on ice and the compound which precipitates is filtered by suction. It is purified in the manner indicated in Example 1. The 5-brom-4-ethoxybenzene-1-carboxyamino-2-thioglycollic acid so obtained, after being recrystallized from glacial acetic acid, melts at 192° C. to 193° C.

We claim:

1. Process for the manufacture of a 4-alkyloxybenzene-1-carboxyamino-2-thioglycollic acid which comprises subjecting one part by weight of a 4-alkyloxy-1-cyanobenzene-2-thioglycollic acid to a limited treatment for a period not substantially longer than 18 hours with not more than about 5 parts by weight of sulfuric acid of about 90 percent strength.

2. Process for the manufacture of a 4-alkyloxy-benzene-1-carboxyamino-2-thioglycollic acid which comprises subjecting one part by weight of a 4-alkyloxy-1-cyanobenzene-2-thioglycollic acid to a limited treatment with not more than about 5 parts by weight of sulfuric acid of about 90 percent strength for a period not substantially longer than about 15 minutes and at an elevated temperature in the neighborhood of 90° C., and rapidly cooling the reaction mixture with ice.

3. Process for the manufacture of 4-ethoxy-benzene-1-carboxyamino - 2 - thioglycollic acid which comprises subjecting one part by weight of 4-ethoxy-1-cyanobenzene-2-thioglycollic acid to a limited treatment with not more than about 5 parts by weight of sulfuric acid of about 90 percent strength for a period not substantially longer than about 15 minutes and at an elevated temperature in the neighborhood of 90° C., and rapidly cooling the reaction mixture with ice.

In testimony whereof, we affix our signatures.

ERWIN HOFFA.
RUDOLF BRUNE.
JENS MÜLLER.